Dec. 10, 1963 G. A. VAN EXEL 3,113,720

GRAPHICAL COMPUTER

Filed Jan. 23, 1962 2 Sheets-Sheet 1

INVENTOR
GERRIT A. VAN EXEL
BY Hugo Ray
Agent

INVENTOR
GERRIT A. VAN EXEL
BY Hugo Ray
Agent

3,113,720
GRAPHICAL COMPUTER

Gerrit A. Van Exel, 966 Gilcrest Crescent, Richmond, British Columbia, Canada

Filed Jan. 23, 1962, Ser. No. 168,117
2 Claims. (Cl. 235—61)

My invention relates to a computer, particularly adapted to the rapid solution of formulae containing several variables.

For example, in the formula $$L_1=f(L_2,D.t)$$

there are four variables, $L_1$, $L_2$, $D$, $t$.

Knowing the particular functions, and having values for three variables above, the fourth is determinate by conventional mathematical means. Alternate methods of solution may make use of tabulated relationships of the variables, or multiple graphical relationships showing the information of the tables upon a single, or upon a few, charts. A still further solution means employs alignment charts.

Mathematical solution may be lengthy, even when the functions are linear. Tables are bulky and may be unsuitable in certain cases, e.g., in the field or on the job. Multiple graphical means may be difficult to read and use, and can lead to mistakes until one has become well familiar with the particular chart or charts. Alignment charts are rapid and well adapted to the solution of many kinds of problems. They have the disadvantage that the subject relationships must be capable of transformation into a particular form, and certain other disadvantages related to the fact it is required to draw a line or lines upon the chart, or to perform an analogous operation, to read the unknown values.

An object of my invention is to provide means adapted to solve an equation of the form above, which means shall overcome the various disadvantages of the conventional means described above, and also be applicable when the said functions are complex.

A further object is to provide a graph having two axes graduated in values of two of the variables of the equation, and cooperating therewith a series of curves each of which shows the relation of the two variables shown upon the axes for a particular value of the third variable, the fourth variable being held at a particular fixed value.

A further object is to provide that the said graph comprise a transparent sheet of graph material, and a said group of curves upon another sheet of material, and means whereby the two are placed in such relationship with one another as shall satisfy the conditions above, wherein a particular value is assigned to the fourth variable.

A further object is to provide means whereby the position of the curves relative to the graph may be changed, so that the changed position shall apply to a different value of the fourth variable.

A still further object is to provide a means of continuous change of position as aforesaid whereby the said family shall be caused to apply to any particular value of the fourth variable within a range thereof, and index means to set the two members to a particular value of the fourth variable within the range aforesaid.

A preferred embodiment of the device of my invention comprises two moving members as below.

The device may be constructed of cardboard or similar material. The first member has an opening or window having, in fixed relationship thereto, a sheet of transparent graph material, the first member contains also a second opening the index opening. Pivoted to the first member in swinging relation thereto is the second member upon which is drawn the group of curves. The pivoting is such that the curves are visible through the graph window, the position of the said curves with respect to the graph axes changing as the second member is rotated. The second member contains also an index line visible through the index opening aforesaid, the index opening being suitably graduated, the first and second members may be placed at will in particular relationship to one another.

The stated objects, and other objects and advantages of my invention will become apparent to those skilled in the art from the description below, in conjunction with the drawings, showing in detail the physical and mathematical method of construction of a device according to my invention.

Figures 1, 2, 3, 6, 7, 8:
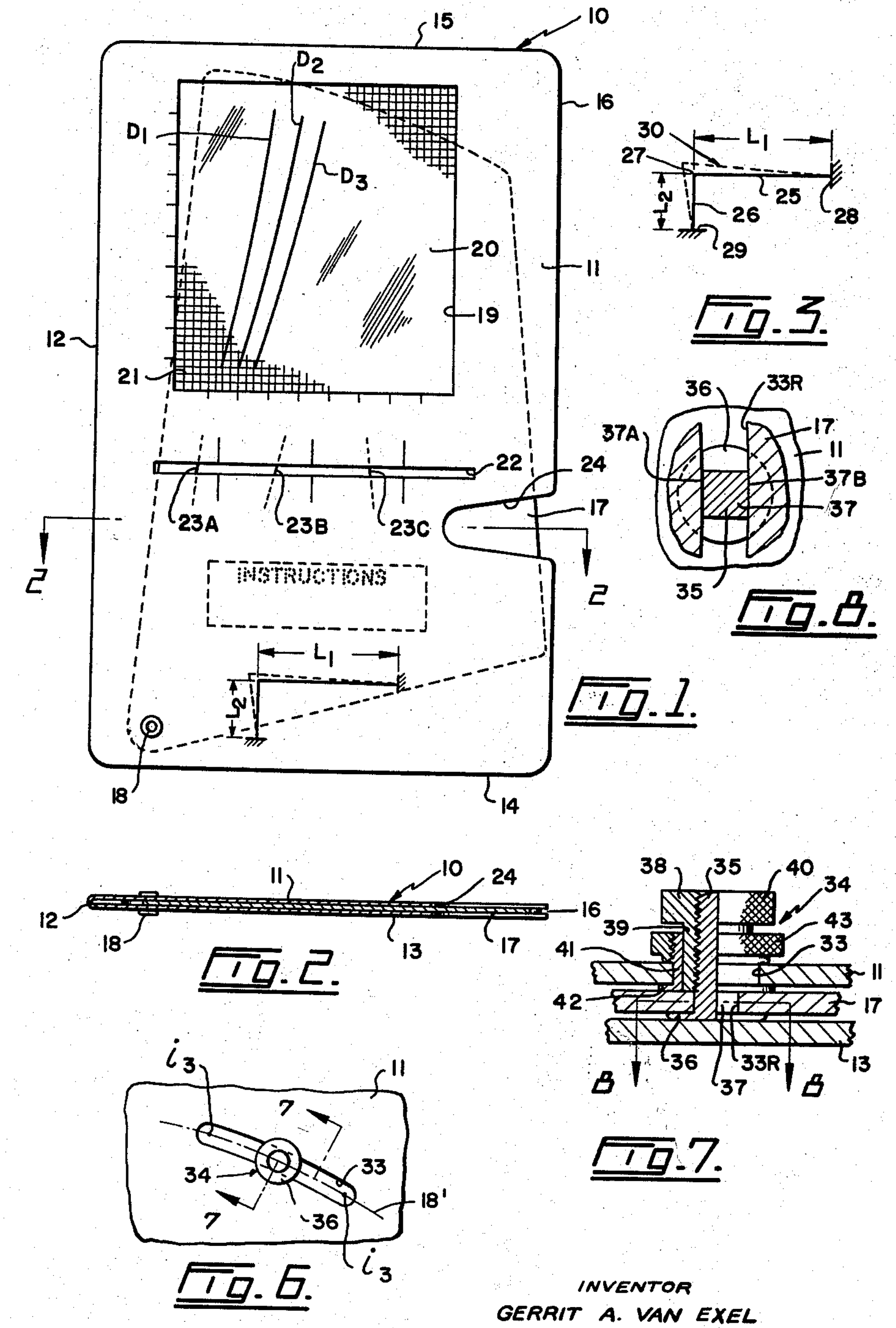
FIGURE 1 is a general view of the invention in plan.
FIGURE 2 is a section on line 2—2 of FIGURE 1.
FIGURE 3 is a diagram illustrating the particular problem for the solution of which the embodiment of FIGURE 1 is adapted.
FIGURE 6 shows at enlarged scale a fragment of the embodiment containing a curved centroid slot.
FIGURE 7 is a section on line 7—7 of FIGURE 6.
FIGURE 8 is a section on line 8—8 of FIGURE 7.

In FIGURE 1 the numeral 10 indicates my computer generally, having the rectangular face member 11, folded at a long edge 12 to form a rear member 13 (see FIGURE 2). Said front and rear members are obviously fastened together along the bottom and top edges 14, 15, defining an envelope-like structure having the open side 16. Within the envelope is a member 17, which I call the "rotor," capable of limited rotation about the pivot 18. The material of the envelope is suitably a cardboard or may be, for example, aluminum sheeting, and the rotor 17 is suitably of similar material.

The face 11 contains a rectangular cut out or "window" 19 in which is obviously inserted a sheet of transparent material 20 in fixed relation thereto, the transparent material having conventional graph paper markings as 21 on a surface thereof. Below the window is a narrow rectangular index aperture 22.

Upon the upper surface of the rotor 17, visible through the transparent material 20 and in close relation thereto, is drawn a series of curves such as D1, D2, D3. Graph X and Y axes are formed by the sides of the window and are suitably graduated, which graduations are not shown. The index lines 23A, 23B, 23C are also drawn on the rotor in position so as to be visible through the index aperture 22, which is also graduated as will later be explained. These graduations are not shown.

The upper and lower portions 11 and 13 of the envelope are cut as shown at 24 to form an opening so that the rotor 17 may be moved, as required, by grasping it with the thumb and forefinger. It is seen that rotation of 17 in this manner will alter the position of the family of curves with respect to the axes of the said graph, and that the index lines will also move with respect to the graduated index aperture 22 whereby said rotor may be set to any required index reading.

I shall now describe the construction of the curves and index lines, and the method whereby the position of the pivot 18 is determined so that the device will function in the required manner. The construction is given for a computer designed to solve a particular complex problem, illustrated in FIGURE 3, a two member right angle pipe system under thermal stress.

Two pipe members 25, 26 of lengths $L_1$, $L_2$ respectively are at right angles joined by the elbow 27. The ends of the pipes remote from said elbow are rigidly fixed at 28 and 29. Both pipes are of the same diameter and material. The pipes carry fluid under pressure and at a high temperature. The unstrained position of the system is shown by solid lines in FIGURE 3, the strained position taken up under operating conditions is indicated generally by the broken outline 30. Given the length $L_1$, D the diameter of the pipe, and $t$ the temperature of the fluid it is required to determine $L_2$—the said length $L_2$ to be such that allowable stresses are not exceeded.

The required length $L_2$ can be computed from the equation previously given, the functions being known. An analytical method for solution of problems of the general kind of which FIGURE 3 is a specific example is given in chapters 3 and 5 of "Design of Piping Systems," by the M. W. Kellogg Company, 2nd edition, published by John Wiley & Sons Inc., New York, Library of Congress Catalogue Card Number 56–5573.

Chart C–5 on page 344 of the cited work is based upon accurate analyses according to the formulae given elsewhere in that work. The said table is adapted to solution of the FIGURE 3 problem as described in detail under the heading "Sample Calculation 4—5" on page 95. Using the procedure there described I obviously construct a family of curves, FIGURE 4, giving the relation between $L_1$ and $L_2$ for several specific pipe diameters at the temperature $t2$. Constructing other such families for different temperatures such as $t$, and $t3$ I have observed that, while the position and orientation of the said families differed in a marked manner according to temperature, there was in fact little difference in shape from family to family throughout the significant and useful range, and that the transformation of the FIGURE 4 family applicable to a temperature $t2$, to that of another family showing the relation at a different temperature could usually be effected by rotation of the $t2$ family about a particular centre.

Figure 4:
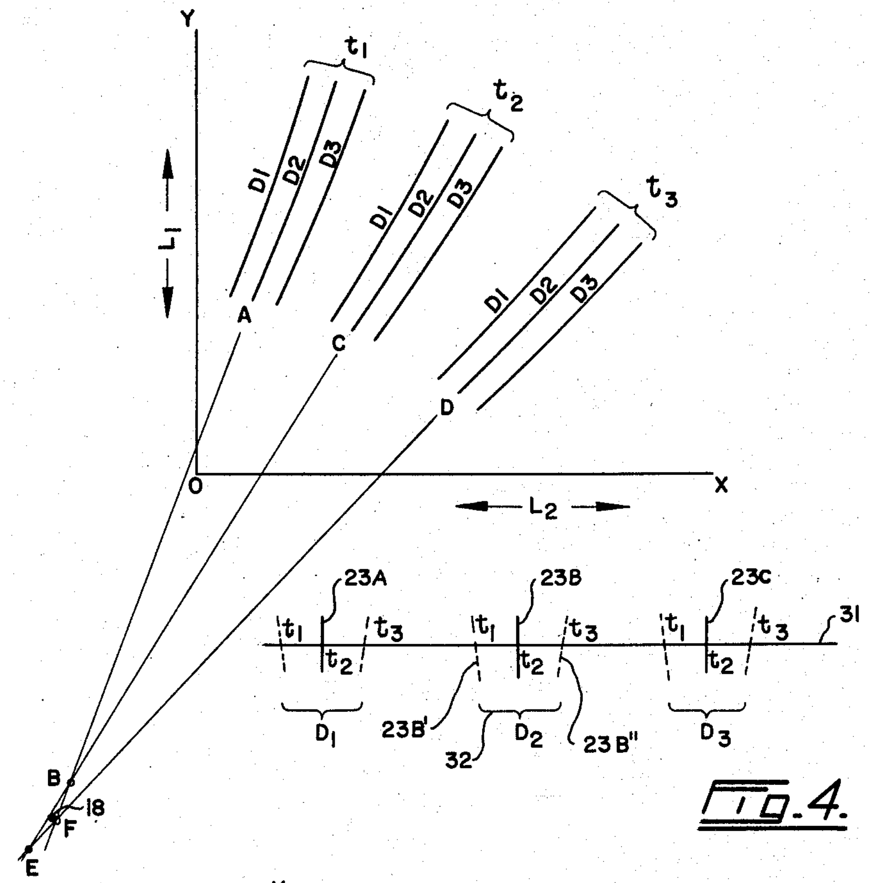
FIGURE 4 is a diagram for use in making the pattern.

In FIGURE 4, the axes OY, OX are graduated in units of $L_1$ and $L_2$ respectively, and a family of curves for the temperature $t_1$ is shown for the pipe diameters D1, D2, D3, which curves give the required relation between $L_1$ and $L_2$ for the specified conditions. Similarly the families $t2$ and $t3$ show the relation at temperatures $t2$ and $t3$.

The pivot point 18 is located in the following manner. The line AB is drawn central of the family $t_1$ in a mean position as determined by eye. The line CB, similarly central of the family $t2$ is drawn to intersect AB in B. In the same way, DE is drawn to intersect CB produced in E and AB produced in F, forming the triangle BEF which is seen to be analogous to a triangle of error. With careful adjustment of the positions of the lines CB etc., the triangle of error may be made to approach a point, when B, E, and F will coincide. It will however ordinarily suffice to locate the pivot 18 centrally within the triangle as shown. A line 31, the index scale line, is drawn below OX and parallel thereto.

A pattern for use in laying out the rotor is made in the following manner, suitably upon a transparent tracing medium. The said medium superimposed upon FIGURE 4, trace the $t2$ family, draw a line 23B at right angles to the index line 31 to intersect the same in $t2$, and mark pivot point 18.

The pattern now has marked upon it three curves, D1, D2, D3 coincident with the respective curves of the $t2$ family, the index line 23B, and the pivot point 18.

Rotate the pattern about 18 until D2 of the pattern is substantially in coincidence with D2 of the $t_1$ family. It will be found that curve D2 $t_1$ differs somewhat in shape from that of D2 $t2$, the curve of the pattern. Accordingly a position of best mean fit is chosen so that substantial coincidence, within the limits of error to be expected in such a device, may be effected. In this position 23b of the pattern will have moved to the position shown by the broken line 23–B' to intersect 31 in $t_1$. Prick this position through and mark the point $t_1$ on the pattern and on FIGURE 4.

In the same manner, D2 of the pattern is set to a best mean fit to D2 $t3$ when said index line will have moved to 23B'' to locate $t3$. The positions $t_1$ $t2$, $t3$ now located serve to set curve D2 of the pattern, to D2 of the required temperature, at will. Bracket 32 is marked D2 to indicate that these intersections, hereinafter referred to as index marks, have reference to pipe diameter D2. During the procedure above it will be noted that coincidence will have been effected only with respect to the D2 curves of the $t_1$ and $t3$ families.

Set the pattern to the position first above described, namely the $t2$ family in coincidence with the pattern curves when 23b will be at the index point $t2$, and draw another index line 23C to intersect 31 in $t2$. Substantial coincidence is now effected with the D3 curves, and index marks $t_1$, $t2$, $t3$ referring to diameter D3 curves, and lished and marked in the manner previously described. Similarly, index marks related to D1 curves are established by means of the index line 23A.

The pattern will now obviously serve to lay out the rotor 17. The pattern is also obviously employed to lay out the front face 11, and to mark thereon correct positions for the window 19 and the index scale aperture 22, the lower edge of which is set to coincide with index line 31, and correctly to mark the index aperture with temperature graduations according to each pipe diameter. Further details of the mechanical construction of the device are considered to be obvious. Temperature graduation intermediate the values for which the construction is given may be effected by repetition of the procedures given, or by interpolation, or both. The range may be extended to more than three specific pipe diameters as required.

In FIGURE 4, while the relationships shown are not straight lines, the curvature is small.

Figure 5:
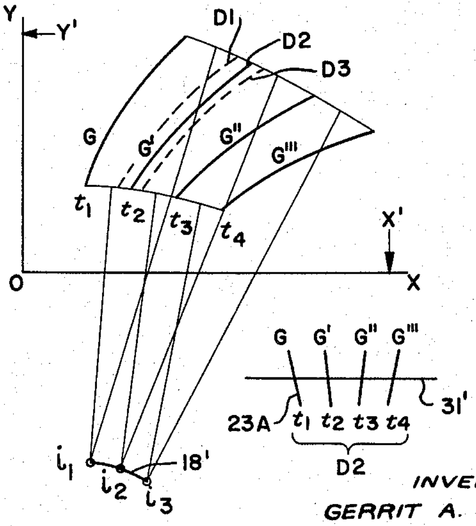
FIGURE 5 illustrates procedure alternative to that of FIGURE 4.

An alternative procedure is preferred for greater curvatures, such as appear in FIGURE 5.

Here a curve is considered to have moved to the right to successive positions, G', G'', G''', the motion G to G' being about the center $i_1$, G' to G'' about $i2$, G'' to G''' about $i3$. The construction shown to locate the positions of $i$ will be recognized as the well known kinematic construction for instantaneous centre of a moving element as given in standard references upon the subject, for example commencing on page 11 of the 2nd edition of "Kinematics of Machines," R. J. Durley, also published by Wiley. The curve $i_1$ $i2$, $i3$ will be recognized as the centrode of the curves which centroid is indicated by 18' in FIGURE 5.

Upon each side of G' are shown broken line curves D', and D3, and the curve G' is marked D2. Thus G' is comparable to the curve D2—$t2$ of FIGURE 4, namely a central curve of a family for a particular temperature $t2$. G, G'', G''' similarly are central of families for the temperature $t_1$, $t3$, $t4$—which families are not shown in FIGURE 5. These are constructed according to the procedures in the reference cited.

Draw the index scale line 31¹, and the index line G', corresponding to 31 and 23B of FIGURE 4, G' cuts 31¹ in $t2$.

To make the pattern, place the transparent tracing medium over FIGURE 5 and, proceeding as before described, trace the OX and OY axes, the G family, the index scale line 31¹, the index line G', and the centroid 18' pricking and marking $i$, $i2$, $i3$. Swing the pattern about $i$, until G' of the pattern is coincident with G of FIGURE 5 when the index line G' will have moved to the left to G, prick through the cut with 31¹ and mark said cut $t_1$. Put the trace back to the initial position G' and 31¹ of the trace coincident with the corresponding lines of FIGURE 5. Swing about $i2$ effecting coincidence between G' of the trace and G'' of FIGURE 5, when the index line G' will have moved to G'' cutting 31¹ in $t3$. In the same manner, about $i3$, swing and establish the cut $t4$. We have now marked the scale line 31¹ of FIG- URE 5 with successive temperatures $t_1$ to $t4$ having reference to the diameter D2.

Successive index graduations for these temperatures at diameters $D_1$ and D3 are established in the same manner, as before described with reference to FIGURE 4, using additional index lines and rotating successively about the respective isocentres, when the graduations of the index line will be similar to the FIGURE 4 graduations If intermediate temperatures are required, graduation may be effected as before described. To establish $D_1$ positions, broken line curve $D_1$ is successively placed in coincidence with the corresponding $D_1$ curves (not shown) of the $t_1$, $t3$, $t4$ families.

The FIGURE 5 trace pattern is obviously used to lay out the front member 11, marking the various openings and graduations substantially as before. The centroid 18′ is also marked at this time, the positions of $i$, and $i3$ being shown, to form the centreline of the slot 33 FIGURE 6. Fiducials X′ and Y′ are marked on the axes.

The pattern is also used to lay out the rotor 17 marking the three curves, $D_1$, D2, D3 (of the $t2$ family), the index scale line 31, the index line G′ referring to the D2 temperature graduations and the index lines (not shown) referring to $D_1$ and D3. Upon the rotor are also marked the fiducial lines X′ and Y′ as shown, the arrows of which fiducials register against the X and Y axis fiducials, respectively. The fiducial marks are suitably T-shaped. The crosses of the T do not show in FIGURE 5 since they are coincident with the axes.

FIGURE 6 shows in plan detail of the slot 33 and pivot assembly 34. Slot 33 is made in the front member 11, and the rotor member 17 is slotted at 33R (FIGURE 7). The centre lines of the slots are coincident when the fiducials are in register as above.

As shown in FIGURE 7, only, the pivot member indicated generally by the numeral 34 comprises the threaded bolt 35 passing through the two slots 33 and 33R, which bolt has the thin flat head 36. The shank of the bolt adjacent the head is substantially rectangular in cross section as shown at 37 in FIGURE 8 so that the faces 37A, 37B, thereof are slidable of the slot 33R. Cooperating with the bolt 35 is the nut member 38 having a cylindrical shank 39 and a knurled head 40.

The collar 41 has inside diameter fitting the outside diameter of the cylindrical shank 39 rotatable thereof, 41 is externally flanged at 43.

The slot 33 is rounded at each end, the centres of the semi-circles at $i$, and $i3$. The width of this slot, and thus the diameter of the semi-circles, is the outside diameter of the collar 41, FIGURE 7. The slot 33R is the width of the member 35, FIGURE 8, and its length is similarly such that full travel of 35 therein is the centroid length, $i$, $i3$.

Given L2, D, and $t$, my computer is used as follows to determine $L_1$.

In the embodiment of FIGURE 1, set the rotor 17 so that the index line referring to diameter D indicates temperature $t$ upon that part of the index scale relating to diameter D. This having been done, the value of $L_1$ may be read directly from the curve D through the window 19. It is seen that solution is simple and quick.

In the slotted centroid embodiment the initial position is with slots 33 and 33R coincident. As previously explained, accurate recovery of this position is effected by setting the before mentioned fiducials against the OX and OY graph axes. Loosen the knurled heads of 38 and 43 of the assembly 34. For temperatures between $t$ and $t2$ set the pivot assembly 34 at the extreme left of the slot, and tighten; for the range $t2$ to $t3$ set in the middle of the run, the position shown in FIGURE 6; and for the $t3$ to $t4$ range set, at the extreme right. The slot may obviously be marked with these temperatures if desired. The pivot assembly having been set to the required temperature range as above, and tightened, the rotor may be set as before, and the required value of $L_1$ read directly off the curve for the relevant diameter.

In lieu of the envelope of opaque material and window embodiment of the member 10 as described, said member may be constructed of a transparent material when the graph graticule may be suitably printed or otherwise marked upon the inner face, preferably, of that material, and the markings of the X and Y axes, printed on the outer surface. In this case, there would not be a window opening with inserted graph material. Similarly, in lieu of the index opening 22 and graduations thereof, there would be a suitably graduated index scale. The remainder of the surface of the transparent material may be opaqued.

In either the transparent material or opaque-with-window embodiment, I may dispense with the rear member 13.

What I claim is:

1. In a computing device adapted for the graphical solution of equations having four variables comprising; a first member containing a transparent portion upon which is marked a graph graticule the axes of which are graduated in terms of two of the variables aforesaid, the first member having an aperture indexed in terms of the fourth variable; a second member having a series of curves to cooperate with the graticule and an index line to cooperate with the index of the apertures; the second member movable relative to the first member; the foregoing so adapted that, in a particular position, a curve of said series shall exhibit, in cooperation with the graph graticule, the relation between two of the variables for a particular constant value of the third variable, the fourth variable having a particular constant value shown by the position of the index line relative to the indexed aperture; and (*a*) the series of curves having a centroid, a slot in the second member the centreline of which is the centroid aforesaid, (*b*) a slot in the first member to correspond with the slot in the second member, (*c*) movable pivot means cooperating with both slots whereby the motion of the second member with respect to the first member is restricted to rotation about a selected point of the said centroid.

2. A device as claim 1, the pivot means having a central bolt with a shank portion and a head portion, the shank adjacent the head substantially rectangular in cross section slidable in the slot of the second member, the remainder of the shank portion threaded; cooperating with the threaded portion, a nut member having a cylindrical shank, a collar on the cylindrical shank said collar slidable within the slot of the first member, a flange at one end of the collar, the other end thereof threaded to receive a nut.

References Cited in the file of this patent

UNITED STATES PATENTS

| | | |
|---|---|---|
| 2,179,531 | Trapnell | Nov. 14, 1939 |
| 2,232,319 | Gay | Feb. 18, 1941 |
| 2,869,787 | Cordry | Jan. 20, 1959 |